United States Patent
Appel

(12) United States Patent (10) Patent No.: US 7,915,775 B2
Appel (45) Date of Patent: Mar. 29, 2011

(54) SUBMERSIBLE MOTOR

(75) Inventor: Kjeld Appel, Silkeborg (DK)

(73) Assignee: Grundfos Managements a/s, Bjerringbro (DK)

( * ) Notice: Subject to any disclaimer, the term of this patent is extended or adjusted under 35 U.S.C. 154(b) by 79 days.

(21) Appl. No.: 12/394,151

(22) Filed: Feb. 27, 2009

(65) Prior Publication Data

US 2009/0267435 A1 Oct. 29, 2009

(30) Foreign Application Priority Data

Feb. 29, 2008 (EP) .................................... 08003849

(51) Int. Cl.
*H02K 5/16* (2006.01)
(52) U.S. Cl. ........................................................ 310/90
(58) Field of Classification Search ................... 310/90; 384/425
See application file for complete search history.

(56) References Cited

U.S. PATENT DOCUMENTS

| 4,042,847 | A | * | 8/1977 | Jensen | 310/87 |
| 4,636,672 | A | * | 1/1987 | Iwata et al. | 310/87 |
| 5,820,271 | A | * | 10/1998 | Hackett, Jr. | 384/425 |

FOREIGN PATENT DOCUMENTS

WO 98/32980 A1 7/1998

* cited by examiner

*Primary Examiner* — Nguyen N Hanh
(74) *Attorney, Agent, or Firm* — Panitch Schwarze Belisario & Nadel LLP

(57) ABSTRACT

A submersible motor is provided for the drive of a submersible pump, with a rotor (6, 10) which is mounted in the motor housing (2) via a thrust bearing (16). The thrust bearing (16) includes a stationary bearing ring (34) on whose first axial side a thrust bearing surface is situated and whose opposite second axial side (40) has a spherical curvature. The second axial side of the bearing ring (34) bears on a correspondingly spherically curved, annular abutment surface (42) of a bearing carrier (44).

21 Claims, 3 Drawing Sheets

SUBMERSIBLE MOTOR

BACKGROUND OF THE INVENTION

The invention relates to a submersible motor for the drive of a submersible pump.

Such submersible motors are designed as electric motors and comprise a rotor with a rotor shaft, which must be mounted in the motor housing in the radial as well as axial direction. With the drive of a pump, in particular of a centrifugal pump assembly, mainly axial forces occur in a defined axial direction in operation. The main thrust bearing is arranged in this direction, in order to accommodate axial forces which act on the rotor shaft or the rotor.

In order to permit an automatic, exact alignment of the thrust bearing surfaces in a plane normal to the rotation axis, it is known to centrally support the stationary part of the thrust bearing on a ball. A pivoting in all directions is possible on the ball. Moreover, the central ball may be adjusted in the axial direction, in order to be able to exactly set the position of the thrust bearing and thus the position of the rotor shaft. The stationary part of the thrust bearing must be adequately stiff and thus also dimensioned in a large manner, for the force transmission from the thrust bearing surfaces to the mentioned ball.

BRIEF SUMMARY OF THE INVENTION

With regard to this, it is the object of the invention to provide a submersible motor with such an improved thrust bearing, with which the components of the thrust bearing are designed in a slimmer and more compact manner and with less use of material.

The submersible motor according to an embodiment of the invention, i.e., an electrical submersible motor, is provided for the drive of a submersible pump, in particular of a centrifugal pump. The submersible motor, in the known manner, comprises a rotor with a rotor shaft as the case may be, which is mounted via a thrust bearing in the rotor housing. Preferably, the thrust bearing is thereby attached on the rotor shaft which extends through the actual rotor of the electric motor. The thrust bearing, in the known manner, comprises two parts: a stationary part which is fixed on the motor housing, and a moving part which is fixed on the rotor or the rotor shaft.

According to an embodiment of the invention, the stationary part of the thrust bearing is designed as a stationary bearing ring. This bearing ring has a first axial side on which a thrust bearing surface is situated. This thrust bearing surface is in contact with the moving part of the thrust bearing. The thrust bearing surface thereby is preferably made of stainless steel, while the moving part of the thrust bearing is preferably manufactured of carbon or graphite. It is to be understood that one may however also apply other material pairings.

Moreover, the stationary bearing ring has a second axial side which is opposite to the first axial side. This axial side, according to the invention has a spherical curvature. That is, the axial-side surface of the bearing ring on its second axial side has the shape of an annular sector of a ball surface, the shape of a spherical segment between two parallel circles. This second axial side of the bearing ring bears on a corresponding spherically curved, annular abutment surface of a bearing carrier. The abutment surface of the bearing carrier is curved corresponding to the axial side of the bearing ring, in a manner such that it likewise has a sector of a ball surface with the same radius as the curvature of the bearing ring. The abutment surface likewise has the shape of an annular sector of a ball surface, i.e., the shape of a spherical segment between two parallel circles. By way of the fact that the two annular surfaces, i.e., the second axial side of the bearing ring and the curved abutment surface of the bearing carrier have the same spherical curvature, both may pivot to one another about the ball middle point of the curvature. This permits an automatic alignment of the bearing ring relative to the moving part of the bearing, which is attached on the rotor.

By way of the fact that the abutment surface of the bearing ring is designed in an annular manner on the bearing carrier, it is possible to relocate this abutment region in which the axial force is transmitted from the bearing ring onto the bearing carrier, radially to the outside, into the radial region in which the axial forces also act on the bearing ring. Thus, the bearing ring may be designed such that it essentially only needs to transmit an axial pressure force. Thus, the force engagement points of the axial force from the moving part of the thrust bearing onto the bearing ring and from the bearing ring onto the bearing carrier may be located essentially at the same radius with respect to the rotation axis of the rotor, so that essentially no bending moments act, given a force transmission onto the bearing ring. Thus, the bearing ring as a whole may be designed in a slimmer and thinner manner with less material use.

The middle point of the spherical curvature of the second axial side of the bearing ring and accordingly the middle point of the spherical curvature of the abutment surface of the bearing carrier are preferably situated on a rotation axis of the rotor. An optimal alignment of the thrust bearing surface with respect to the rotation axis of the rotor is possible in this manner.

The abutment surface of the bearing carrier and the thrust bearing surface of the bearing ring lie essentially above one another preferably in a projection along the rotation axis. That is, preferably the thrust bearing surface of the bearing ring and the abutment surface of the bearing carrier extend in the radial direction in the region of the same radial distances with respect to the rotation axis of the rotor. It is thus ensured that the force engagement points or force-transmitting surfaces, on the one hand, from the moving part of the bearing onto the bearing ring, and on the other hand, from the bearing ring onto the bearing carrier, lie above one another seen in the axial direction parallel to the rotation axis of the rotor. That is, the force transmission from the moving part of the thrust bearing up to the bearing carrier is effected preferably along a straight line or a cylinder parallel to the rotation axis with a constant radial distance to this rotation axis. Thus, moments acting on the bearing ring are minimized or ideally completely avoided.

It is further preferable for the rotor to extend in the axial direction beyond the thrust bearing surface and preferably the abutment surface on the bearing carrier. This is likewise possible by way of the abutment surface of the bearing carrier on which the bearing ring bears, being designed in an annular manner and thus the central region remains free. The rotor shaft may extend through this central region which remains free. This permits the radial mounting of the rotor shaft to be able to be situated closer towards the end of the rotor shaft or of the rotor than the described axial mounting.

Further preferably, the bearing carrier is designed in a sleeve-shaped manner. Thereby, the abutment surface for the bearing ring is formed on an end-side of the sleeve.

According to a further preferred embodiment, the bearing carrier may be moved in the axial direction parallel to the rotation axis of the rotor. This permits the position of the thrust bearing arrangement to be displaced parallel to the rotation axis of the rotor, and thus the positioning of the rotor or the rotor shaft in the axial direction. This may be essential, in order to bring the free end of the rotor or the rotor shaft, which is provided for coupling to a pump, into a defined axial position with respect to the motor housing. Suitable setting means, for example setting screws, with which an axial displacement of the bearing carrier is possible, may be provided for moving the bearing carrier.

Particularly preferably, the bearing carrier is provided with a thread concentrically to the rotation axis of the rotor, which is in engagement with a thread on a receiver union fixed on the motor housing. Thereby, the bearing carrier is preferably designed in a sleeve-like manner. The thread is further preferably designed on the inner periphery of the bearing carrier, and the receiver union on the motor housing preferably comprises a corresponding thread on the outer periphery. However, a reverse design is also possible, i.e., a thread on the outer periphery of the bearing carrier and on the inner periphery of the receiver union. An axial movement of the bearing carrier parallel to the rotation axis of the rotor is possible by way of rotation of the bearing carrier on the thread on the receiver union, by which the abutment surface for the bearing ring may be positioned in the axial direction. The receiver union is preferably designed on a cover or base piece which is attached on an axial end of a tubular part of the motor housing which forms the stator housing.

Further preferably, the thread has a radial distance to the rotation axis of the rotor, which essentially lies in the region of the radial extension of the annular abutment surface of the bearing carrier, i.e., in particular is greater than the inner diameter and smaller than the outer diameter of the annular abutment surface of the bearing carrier. By way of this, one succeeds in the thread, in the axial projection along the rotation axis of the rotor, being situated below the abutment surface of the bearing carrier and the thrust bearing surface of the bearing ring. Thus, the force transmission from the bearing carrier onto the receiver union is also effected via the thread along an axis or cylindrical surface which runs essentially in the extension of the force vector of the axial force from the moving part of the thrust bearing onto the thrust bearing surface, and from the bearing ring onto the abutment surface on the bearing carrier. That is, the complete force transmission from the moving part of the thrust bearing onto the base region of the motor housing runs preferably along a continuous axis or cylinder surface parallel to the rotation axis of the rotor. Thus, bending moments onto the force-transmitting components, in particular onto the bearing carrier, are largely avoided, so that these components may be designed in a slim manner and with less material use.

It is further preferable to provide a securing pin or a securing screw, in order to secure the bearing carrier on the receiver union against rotation. Thereby, it is to be understood that one may also alternatively apply other securing elements for rotational locking. These elements for rotational locking are preferably releasable, in order to be able to rotate the bearing carrier on the receiver union for setting the axial position of the bearing.

Particularly preferably, openings are provided in the receiver union or in the base piece or cover of the motor housing, which connect to the receiver union, into which openings a securing pin or a securing screw may be inserted. In the latter case, preferably corresponding threads for the securing screw are formed in the openings. The securing pin or the securing screws thereby preferably extend parallel to the rotation axis of the rotor and engage into the bearing carrier in a suitable manner for rotational locking.

According to a further preferred embodiment, engagement elements for applying a tool for rotating the bearing carrier, are formed on the bearing carrier distributed over the periphery, wherein the engagement elements further preferably are designed as pockets on the inner periphery of the bearing carrier which are semicircular in cross section. One may engage into these engagement elements or preferably into these pockets, for example with a screwdriver, in order to rotate the bearing carrier on the thread on the receiver union. Thereby, the tool, for example the screwdriver, is preferably inserted through the same openings into which a securing pin and/or a securing screw for the rotational locking may be inserted. However, also at least one additional opening may be formed in the base piece for leading through a tool.

It is particularly preferable for the at least one securing pin or the at least one securing screw to be in engagement with one of the engagement elements, in order to secure the bearing carrier against rotation. In this manner, one achieves a double function of the engagement elements, on the one hand they may be used for rotational locking and on the other hand indeed for rotation by way of a tool.

The pockets, which are semicircular in cross section, preferably have the shape of a half-cylinder which extends parallel to the rotation axis of the rotor. Thereby, preferably so many equal pockets are distributed over the periphery, that the individual pockets are directly adjacent one another, so that together they form essentially the shape of an inner toothing on the inner periphery of the bearing carrier. In order to permit an engagement of a tool and/or of a securing pin or of a securing screw between the inner periphery of the bearing carrier and the outer periphery of the receiver union, the bearing carrier is preferably formed widened inwards in the radial direction, to an axial end, specifically to the axial end on which the engagement elements or pockets are formed, so that a free space is formed between the inner periphery of the bearing carrier and the outer periphery of the receiver union.

According to a further preferred embodiment, a radial bearing for the rotor or the rotor shaft is arranged in the receiver union. This compact space-saving arrangement is possible due to the fact that the rotor shaft may extend through the bearing carrier beyond the thrust bearing.

On the bearing ring several bearing pads are attached preferably on the first axial side, and these together form the thrust bearing surface. The bearing pads are designed in the form of ring sectors, wherein several bearing pads are preferably uniformly distributed over the periphery of the bearing ring. The moving part of the thrust bearing, which is connected to the rotor, comes to bear on the axial surfaces of the bearing pad in a sliding manner.

Preferably, the bearing pads are axially distanced from the bearing ring and are connected to the bearing ring via connection columns. This, on account of the elastic bending of the columns, permits a certain movement ability of the individual bearing pads to one another and with respect to the bearing ring. An optimal alignment of the bearing pad and thus of the thrust bearing surfaces defined by these, to the abutting moving part of the thrust bearing, may be rendered possible by way of this. Thus, together with the spherical abutment surface, one ensures an essentially automatic positioning of the bearing surfaces to one another. Moreover, a good lubrication of the thrust bearing surface is possible on account of the free spaces between the individual bearing pads.

The bearing pads and the bearing ring are preferably designed together as one piece with the connection columns which connect them. This design may, for example, be effected from stainless steel with precision casting, wherein a further machining, in particular of the abutment surfaces, may be effected.

The bearing carrier and the receiver union are preferably also designed of stainless steel. This particularly lends itself if the submersible motor is filled with fluid, in order to avoid corrosion.

The connection columns between the bearing pads and the bearing ring, preferably in the radial direction with respect to the rotation axis of the rotor, are situated in each case at least partially between the inner periphery and the outer periphery of the abutment surface of the bearing carrier. Particularly preferably, the connection columns are situated essentially completely in the region of the radial extension of the bearings surface. Thereby, the columns preferably extend parallel to the rotation axis of the rotor. Thus, a continuous force transmission along an axis from the thrust bearing surface onto the bearing carrier is made possible, and essentially no bending moments occur in the bearing ring.

The bearing ring is preferably provided with a rotational locking with respect to the bearing carrier. For example, at least one projecting pin or projection may be provided, which engages into a corresponding recess of the bearing ring. Thereby, this engagement preferably has so much play, that the required movement ability of the bearing ring on the bearing carrier along the spherical abutment surface remains ensured.

The submersible motor further preferably comprises a moving bearing ring in the thrust bearing, and this ring is in contact with the thrust bearing surface of the stationary bearing ring and is connected to the rotor with a positive fit. The moving bearing ring, as described above, forms the moving part of the thrust bearing. A secure force transmission onto the bearing ring and a simple attachment of the bearing ring on the rotor may be ensured by way of the positive-fit engagement with the rotor or the rotor shaft. For this, one may provide an additional fastening element, which is firstly fixed on the rotor shaft and comprises engagement elements which come into engagement with corresponding engagement elements on the moving bearing ring with a positive fit. For example, axially extending teeth may be formed on the fastening element, and these engage into corresponding recesses on the bearing ring.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
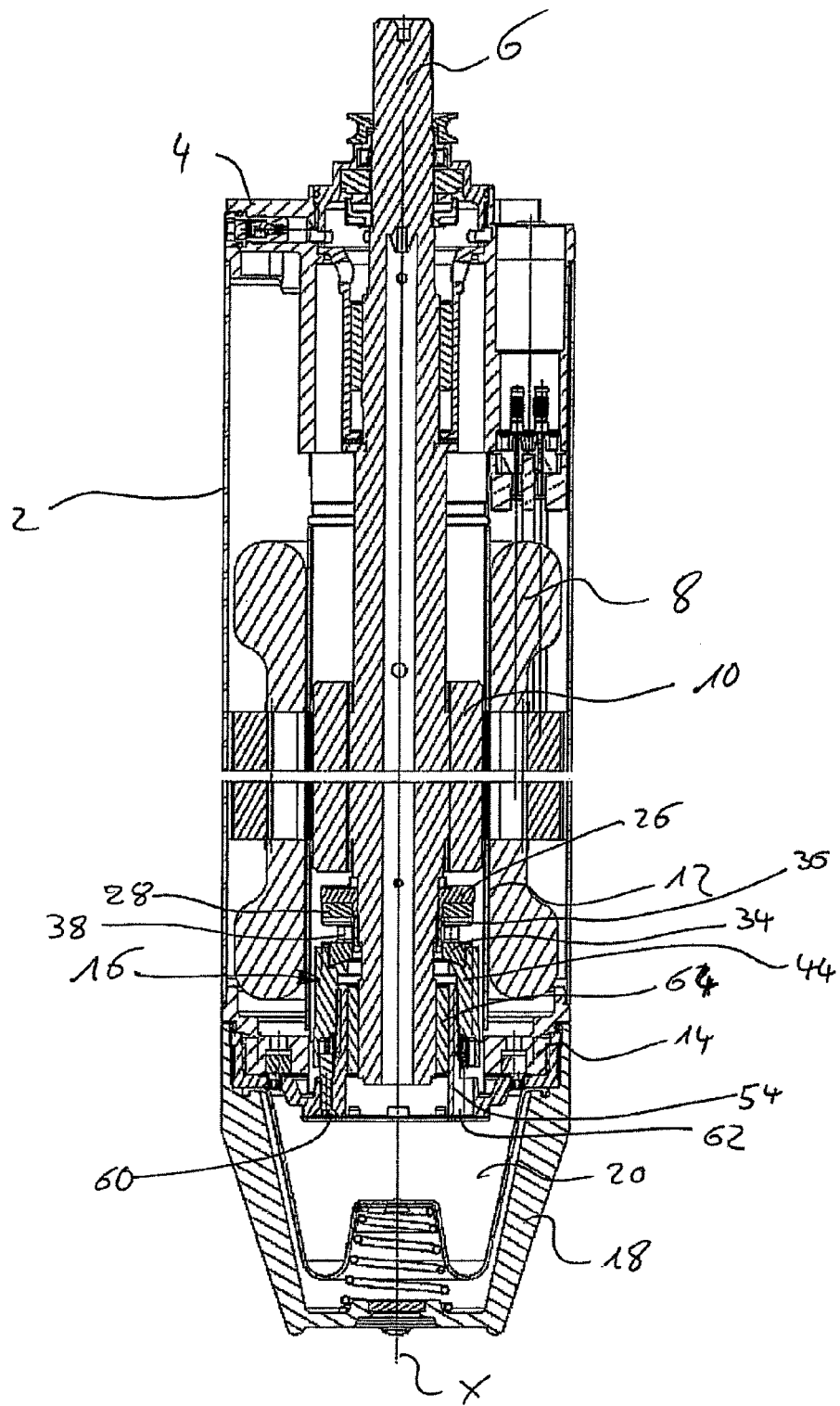
FIG. 1 is a longitudinal sectioned view of a submersible motor according to an embodiment of the invention.
Figure 2:
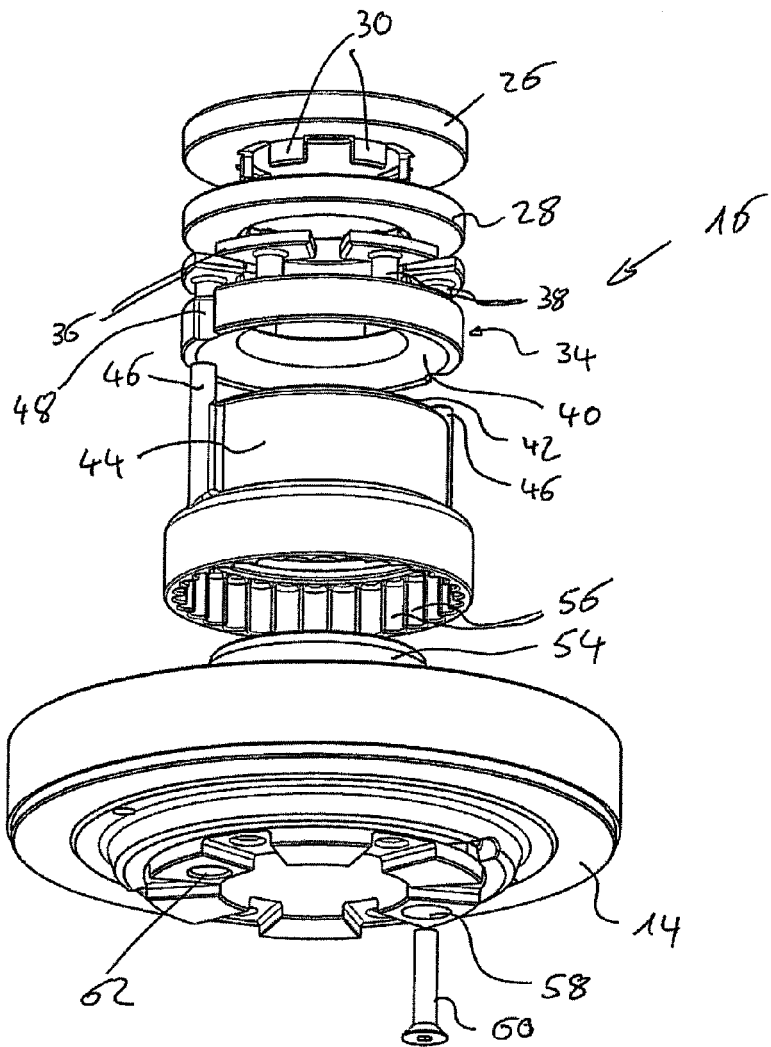
FIG. 2 is an exploded perspective view of the thrust bearing arrangement of the submersible motor according to FIG. 1.
Figure 3:
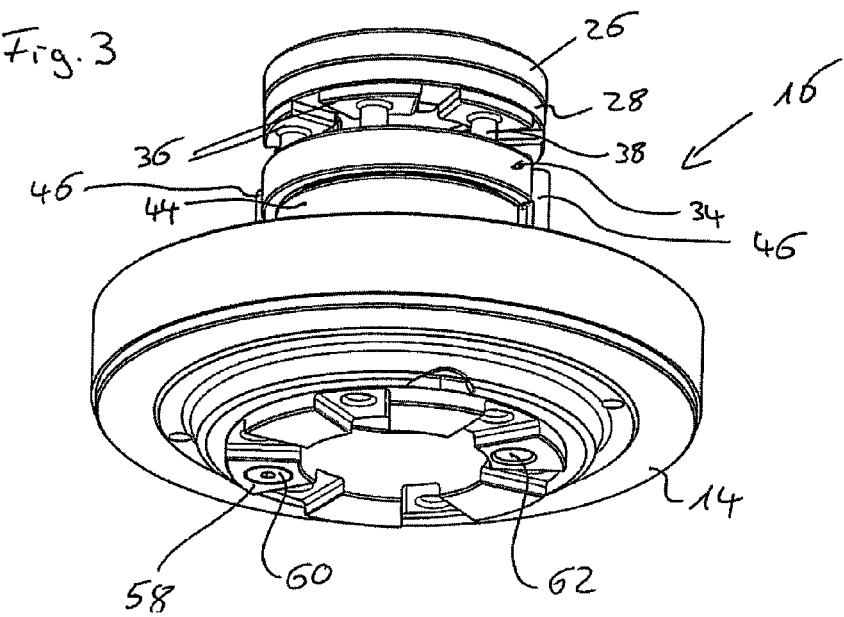
FIG. 3 is a perspective view of the thrust bearing arrangement according to FIG. 2 in the assembled condition.

The submersible motor which is represented in FIG. 1 in a general view, in the known manner comprises a stator housing or motor housing 2, which is designed in an essentially tubular manner. The motor housing 2 at the first end-side of this, is closed by a cover 4, from which the rotor shaft 6 centrally exits, and is envisaged there for connection to a submersible pump. The actual electric drive motor is arranged in the inside of the motor housing 2. This comprises a stator 8, and a rotor 10 which may be rotated in the inside of the stator 8 about the rotational axis or longitudinal axis X. The stator 8 lies in an annular, dry stator space and is separated inwards from the rotor space filled with fluid by way of a can 12. The tubular motor housing 2, at the axial end which is distant to the cover 4, is closed by a base piece 14, which carries the thrust bearing arrangement 16. An end cap 18, which contains an expansion vessel 20 for the fluid-filling of the rotor space, connects to the base piece 14 in the axial direction.

The thrust bearing arrangement 16 accommodates the axial forces which act on the rotor shaft 6 or on the rotor 10 in operation. The construction of this thrust bearing arrangement 16 is described in more detail hereinafter.

The thrust bearing arrangement 16 is shown in detail in the FIGS. 2 to 5. The thrust bearing arrangement 16 comprises a moving part 22, which is fastened on the rotor shaft 6 and rotates together with the rotor shaft 6 or the rotor 10, as well as of a stationary part 24, which is connected to the motor housing 2. The moving part 2 is formed by a carrier ring 26 and a bearing ring 28. The carrier ring 26 which is manufactured preferably of stainless steel, e.g. as a precision casting piece, is fixed on the shaft 6 in a rotationally fixed manner. This fastening of the carrier ring 26 on the rotor shaft 6 may then be effected with a non-positive fit and/or positive fit. The carrier ring 26 on the inner periphery comprises an annular arrangement of teeth 30, which extend axially, i.e., parallel to the longitudinal axis X, and which engage into correspondingly shaped recesses 32 in the bearing ring 28. In this manner, the bearing ring 28 is only fixed on the rotor shaft 6 with a positive fit via the carrier ring 26. The bearing ring 28 is preferably formed of graphite or carbon.

The stationary part 24 of the thrust bearing arrangement 16 comprises a bearing ring 34. On its first axial side, which faces the bearing ring 28 of the moving part 22, several bearing pads 36 are arranged in an annular arrangement, which with their axial end-faces or axial faces which face the bearing ring 28, define the actual thrust bearing surface of the bearing ring 34. The bearing pads 36 are in each case connected to the bearing ring 34 as one piece via a connection column 38. The connection columns 38 permit a certain movement ability of the bearing pads 36 relative to the bearing ring, so that they may align automatically such that they come to bear on the bearing ring 28 in a plane manner with their axial end-faces. The bearing pads, the connection columns 38 and the bearing ring 34 are preferably formed as one piece of stainless steel with procession casting. The bearing ring 34 on the axial side which is distant to the bearing pads 36, comprises an abutment surface 40. This abutment surface 40 has an annular shape and is designed in a spherical manner. That is, the abutment surface 40 has the shape of a ball zone or of an annular cut-out of a ball surface.

Figure 4:
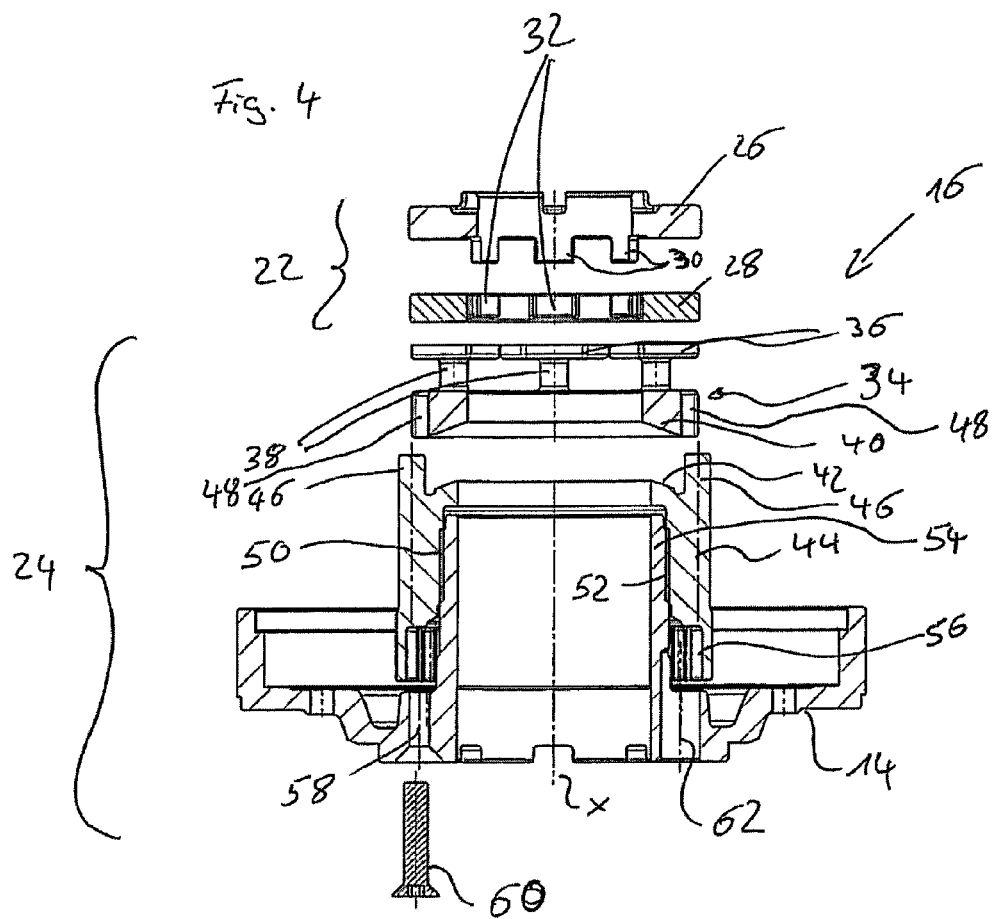
FIG. 4 is a longitudinal sectioned view of the thrust bearing arrangement according to FIGS. 2 and 3, in dismantled condition.
Figure 5:
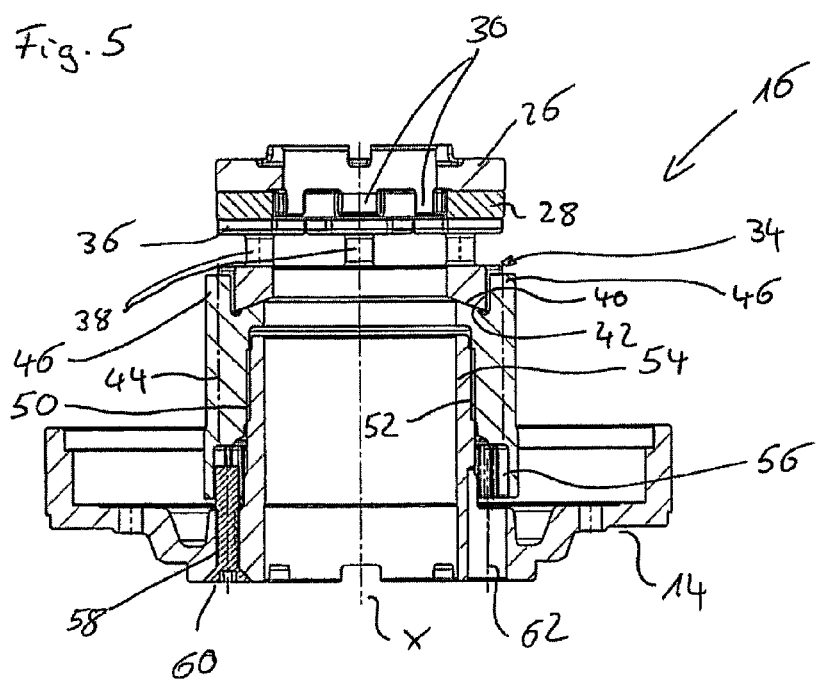
FIG. 5 is a longitudinal sectioned view of the thrust bearing arrangement according to FIG. 2 to 4, in the assembled condition.

As is to be seen in the FIGS. 4 and 5, the abutment surface 40 extends such that the end-faces of the bearing pads 36, in the axial projection along the longitudinal axis X, are situated above the abutment surface 40. The connection columns 38 are also arranged in a region above the abutment surface 40. That is, in the radial direction with respect to the rotation axis X, they are situated in a region between the inner periphery and the outer periphery of the abutment surface 40. In this manner, axial forces which act on the end-face of the bearing pads 36 are transmitted directly in the axial direction, i.e., parallel to the longitudinal axis X, onto the abutment surface 40, without undesirable moments occurring in the bearing ring 34. This permits the bearing ring 34 as a whole to be designed in a slimmer manner.

The abutment surface 40 of the bearing ring 34 comes to bear on an abutment surface 42 of a bearing carrier 44. The bearing carrier 44 is designed in a sleeve-like manner and extends concentrically to the rotation axis or longitudinal axis X. The annular abutment surface 42 is formed at a face-end, that face-end which is distant to the base piece 14 and faces the bearing ring 34. This abutment surface is likewise shaped in a spherical manner, i.e., forms an annular cut-out of a ball surface or of a ball zone. Thereby, the curvature corresponds to the curvature of the abutment surface 40. That is, both surfaces are curved with the same radius about a common middle point which is situated about a longitudinal axis X. This permits the bearing ring 34 to be able to be pivoted by a certain amount on the abutment surface 42, when the bearing ring bears with its abutment surface 40 on the abutment surface 42 of the bearing carrier 44, so that an angle alignment with respect to the longitudinal axis X is possible, in order to bring the axial surfaces of the bearing pads 36 into an optimal surfaced abutment with the bearing ring 28. The abutment surface 42 thereby extends such that it is likewise situated in the axial projection along the longitudinal axis X below the abutment surface 40 of the bearing ring 34. That is, the radial extension of the abutment surface 42 lies in the region of the radial extension of the abutment surface 40. Thus, a continuous direct force transmission along a continuous straight axis or a cylinder parallel to the longitudinal axis X from the bearing pads 36 onto the bearing carrier 44 is possible.

For the rotational locking of the bearing ring 34 on the bearing carrier 44, the bearing carrier 44 in two diametrically opposite sides comprises pins 46 which project in the axial direction and which engage into semi-cylindrical recesses 48 on the outer periphery of the bearing ring 34. Thereby, such a play is provided between the projections 46 and the recesses 48, that the desired movement ability of the bearing ring 34 on the abutment surface 42 remains ensured. The projections 36 are formed as one piece with the bearing carrier 44, preferably of stainless steel with precision casting.

The sleeve-like bearing carrier 44 on its inner periphery comprises an inner thread 50 which is in engagement with an outer thread 52 on the outer periphery of a receiver union 54. The receiver union 54 is designed as one piece with the base piece 14 and proceeding from this extends in the axial direction parallel and concentrically to the rotation axis X, into the inside of the motor housing 2. The inner thread 50 and the outer thread 52 extend likewise concentrically to the longitudinal axis X. By way of rotation of the bearing carrier 44 on the receiver union 54, the bearing carrier 44 is moved in the axial direction on account of the threaded engagement between the inner thread 50 and the outer thread 52. In this manner, the complete thrust bearing may be axially adjusted parallel to the longitudinal axis X, whereby the rotor shaft 6 may also be displaced in the axial direction, in order to be able to set the length by which the rotor shaft 6 projects outwardly beyond the cover 4, to a defined amount.

The inner thread 50 and the outer thread 52 lie on a radius with respect to the longitudinal axis X, which is situated between the inner periphery and the outer periphery of the abutment surface 40 of the bearing ring 34. That is, in the axial projection, the threaded engagement between the inner thread 50 and the outer thread 52 lies below the abutment surfaces 40 and 42. This permits a direct, straight-lined force transmission from the abutment surface 42 via the bearing carrier 44 onto the receiver union 54, whereby undesired moments in the bearing carrier 44 may be avoided. This permits a slim design of the bearing carrier 44 with a low wall thickness.

At its axial end which is distant to the abutment surface 42, the bearing carrier 44 on its inner periphery comprises an annular arrangement of pockets 56. The pockets 56 are designed in a semi-cylinder-shaped manner and in each case extend parallel to the longitudinal axis X. Thereby, the individual pockets bear directly on one another and are arranged annularly in the manner of an inner toothing. The inner diameter of the bearing carrier 44 is widened in the region of the annular arrangement of the pockets 46, so that an annular free space to the outer peripheral surface of the receiver union 54 is given.

A through-hole 58 is formed in the base piece 14, axially aligned with the diameter with respect to the longitudinal axis X on which the middle axes of the pockets 56 are situated. The through-hole 58 is provided with a thread, and serves for receiving a securing screw 60. The securing screw 60 is screwed into the through-hole 18 from the side of the base piece 14, which faces the expansion vessel 20, and extends through the base piece 14 into the free space between the inner periphery of the bearing carrier 44 and the outer periphery of the receiver union 54, wherein it engages into one of the pockets 56 and thus secures the bearing carrier 44 against rotation on the receiver union 54.

A further through-hole 62 is formed on the same diameter circle as the through-hole 58 with respect to the longitudinal axis X, in the base piece 14. This through-hole has a larger diameter than the through-hole 58 and is envisaged in order to introduce a tool through the through-hole 52, said tool being able to engage with the pockets 56 and able to be moved in the through-hole 62, such that the bearing carrier 44 may be rotated on the receiver union 54 by way of the tool, when the securing screw 60 is removed. The tool which is used for this may for example be a screwdriver.

As is to be recognized in FIG. 1, the rotor shaft 6 extends in the axial direction through the thrust bearing arrangement 16, in particular beyond the abutment surfaces 40 and 42, into the receiver union 54. A radial bearing 64 for the rotor shaft 6 is arranged in the receiver union 54. This arrangement is possible on account of the inventive annular design of the bearing carrier 44 and bearing ring 34 with corresponding spherical and annular abutment surfaces 40 and 42, since a central free space is created by this design, through which the rotor shaft 6 may extend.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A submersible motor for the drive of a submersible pump comprising a rotor (6, 10) mounted in a motor housing (2) via a thrust bearing (16), the thrust bearing (16) comprising a stationary bearing ring (34) on whose first axial side a thrust bearing surface is situated and whose opposite second axial side (40) has a spherical curvature, wherein the second axial side of the bearing ring (34) bears on a correspondingly spherically curved, annular abutment surface (42) of a bearing carrier (44), and wherein several bearing pads (36) are attached on the bearing ring (34) on the first axial side and form the thrust bearing surface, the bearing pads (36) being axially distanced to the bearing ring (34) and connected to the bearing ring (34) via connection columns (38).

2. The submersible motor according to claim 1, wherein a middle point of the spherical curvature of the second axial side (40) is situated on a rotation axis (X) of the rotor (6, 10).

3. The submersible motor according to claim 1, wherein the abutment surface (42) of the bearing carrier (44) and the thrust bearing surface of the bearing ring (34) lie essentially above one another in a projection along a rotation axis (X) of the rotor (6, 10).

4. The submersible motor according to claim 1, wherein the rotor (6, 10) extends in an axial direction (X) beyond the thrust bearing surface and the abutment surface (42) on the bearing carrier (44).

5. The submersible motor according to claim 1, wherein the bearing carrier (44) is designed as a sleeve.

6. The submersible motor according to claim 1, wherein the bearing carrier (44) is movable in an axial direction parallel to a rotation axis (X) of the rotor (6, 10).

7. The submersible motor according to claim 1, wherein the bearing carrier (44) is provided with a thread (50) concentrically to a rotation axis (X) of the rotor (6, 10), which is in engagement with a thread (52) on a receiver union (54) fixed on the motor housing (2).

8. The submersible motor according to claim 7, wherein the thread (50, 52) has a radial distance to the rotation axis (X) of the rotor (6, 10), which is situated essentially in a region of a radial extension of the annular abutment surface (42) of the bearing carrier (44).

9. The submersible motor according to claim 7, further comprising at least one securing pin or a securing screw (60) to secure the bearing carrier (44) on the receiver union (44) against rotation.

10. The submersible motor according to claim 7, wherein engagement elements (56) for applying a tool for rotating the bearing carrier (44) are formed on the bearing carrier (44), distributed over its periphery, and wherein the engagement elements (56) are designed as pockets semicircular in cross section on an inner periphery of the bearing carrier (44).

11. The submersible motor according to claim 10, wherein at least one securing pin or at least one securing screw (60) is in engagement with one of the engagement elements (56) to secure the bearing carrier (44) against a rotation.

12. The submersible motor according to claim 7, wherein a radial bearing (64) for the rotor (6, 10) is arranged in the receiver union (54).

13. The submersible motor according to claim 1, wherein the connection columns (38) are situated in a radial direction with respect to a rotation axis (X) of the rotor (6, 10), in each case at least partly between an inner periphery and an outer periphery of the abutment surface (42) of the bearing carrier (44).

14. The submersible motor according to claim 1, wherein the thrust bearing (16) comprises a moving bearing ring (28) which is in contact with a thrust bearing surface of the stationary bearing ring (34) and is connected to the rotor (6, 10) with a positive fit.

15. A submersible motor for the drive of a submersible pump comprising a rotor (6, 10) mounted in a motor housing (2) via a thrust bearing (16), the thrust bearing (16) comprising a stationary bearing ring (34) on whose first axial side a thrust bearing surface is situated and whose opposite second axial side (40) has a spherical curvature, wherein the second axial side of the bearing ring (34) bears on a correspondingly spherically curved, annular abutment surface (42) of a bearing carrier (44), and wherein the bearing carrier (44) is movable in an axial direction parallel to a rotation axis (X) of the rotor (6, 10).

16. A submersible motor for the drive of a submersible pump comprising a rotor (6, 10) mounted in a motor housing (2) via a thrust bearing (16), the thrust bearing (16) comprising a stationary bearing ring (34) on whose first axial side a thrust bearing surface is situated and whose opposite second axial side (40) has a spherical curvature, wherein the second axial side of the bearing ring (34) bears on a correspondingly spherically curved, annular abutment surface (42) of a bearing carrier (44), and wherein the bearing carrier (44) is provided with a thread (50) concentrically to a rotation axis (X) of the rotor (6, 10), which is in engagement with a thread (52) on a receiver union (54) fixed on the motor housing (2).

17. The submersible motor according to claim 16, wherein the thread (50, 52) has a radial distance to the rotation axis (X) of the rotor (6, 10), which is situated essentially in a region of a radial extension of the annular abutment surface (42) of the bearing carrier (44).

18. The submersible motor according to claim 16, further comprising at least one securing pin or a securing screw (60) to secure the bearing carrier (44) on the receiver union (44) against rotation.

19. The submersible motor according to claim 16, wherein engagement elements (56) for applying a tool for rotating the bearing carrier (44) are formed on the bearing carrier (44), distributed over its periphery, and wherein the engagement elements (56) are designed as pockets semicircular in cross section on an inner periphery of the bearing carrier (44).

20. The submersible motor according to claim 19, wherein at least one securing pin or at least one securing screw (60) is in engagement with one of the engagement elements (56) to secure the bearing carrier (44) against a rotation.

21. The submersible motor according to claim 16, wherein a radial bearing (64) for the rotor (6, 10) is arranged in the receiver union (54).

* * * * *